United States Patent [19]
Voyre

[11] Patent Number: 5,459,905
[45] Date of Patent: Oct. 24, 1995

[54] RUBBER BAND BINDER

[76] Inventor: Guy Voyre, Box 999, Nyack, N.Y. 10960

[21] Appl. No.: 218,267

[22] Filed: Mar. 25, 1994

[51] Int. Cl.$^6$ .................................................. B65D 63/00
[52] U.S. Cl. ..................................... 24/17 B; 24/301
[58] Field of Search .................... 24/17 B, 17 A, 24/17 R, 17 AP, 16 R, 300, 301, 298

[56] References Cited

U.S. PATENT DOCUMENTS

| | | | |
|---|---|---|---|
| 428,937 | 5/1890 | Ordner | 24/17 B |
| 556,383 | 3/1896 | Teeter | 24/17 B |
| 913,962 | 3/1909 | Liddy | 24/17 AP |
| 1,006,584 | 10/1911 | Millsaps | 24/17 B |
| 2,095,149 | 10/1937 | Miller | 24/17 AP |
| 3,550,218 | 12/1970 | Woolner | 24/301 |
| 4,286,429 | 9/1981 | Lin | 24/17 B |
| 4,569,108 | 2/1986 | Schwab | 24/17 B |
| 4,686,745 | 8/1987 | Butler | 24/17 B |

FOREIGN PATENT DOCUMENTS

| | | | |
|---|---|---|---|
| 2455553 | 1/1981 | France | 24/17 B |

*Primary Examiner*—Victor N. Sakran
*Attorney, Agent, or Firm*—Israel Nissenbaum

[57] ABSTRACT

A one piece elastic binder element comprised of either one or two rubber bands. The present invention further comprises a novel method for producing rubber bands having enhanced archival binding properties, with a longitudinal grain which closes on stretching, whereby it is not susceptible to drying and embrittled breakage, and the rubber bands so produced. The elastic binder element comprises two bands or portions of a single band, being held together with two metal clamping members deployed such that the one or two bands are configured in dual, spaced, cruciformic or cross-like configurations (i.e., each configuration having a central point, defined by each of the metal clamping members, from which four arms, comprised of segments of the elastic band or bands, extend, at approximate 90° intervals— full lateral and longitudinal extension). The cruciformic configurations are suitable for respective deployment on the front and rear of a file, to engage all four sides of the file, in the binding thereof. Four connective element segments, of the band or bands, interconnect the front arms with the rear arms, thereby peripherally retaining the file between the respective cruciformic configurations. No relative movement or shifting is possible between the lateral and longitudinal holding arms and the files and papers are positively held thereby.

11 Claims, 3 Drawing Sheets

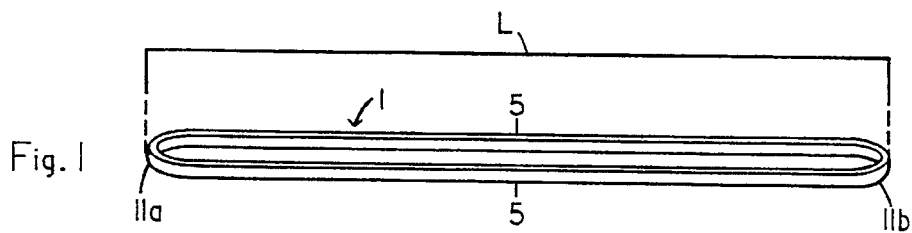
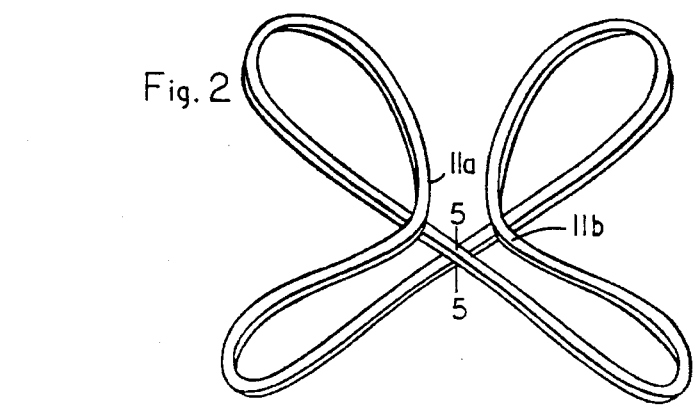
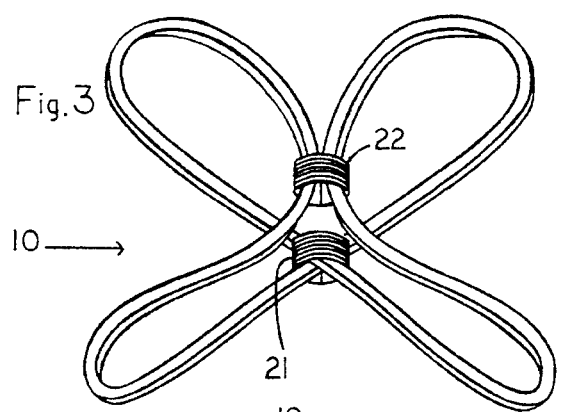
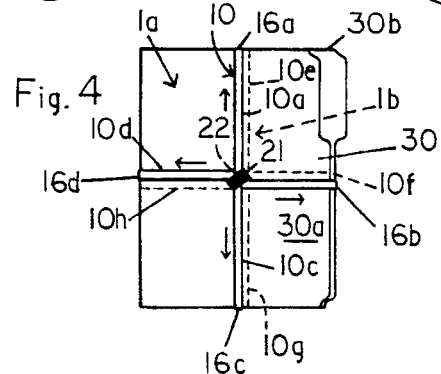
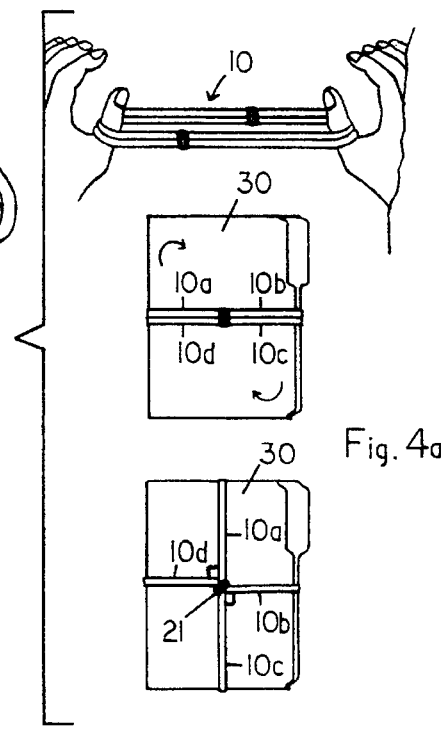

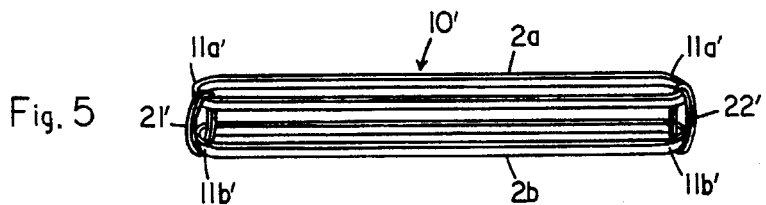
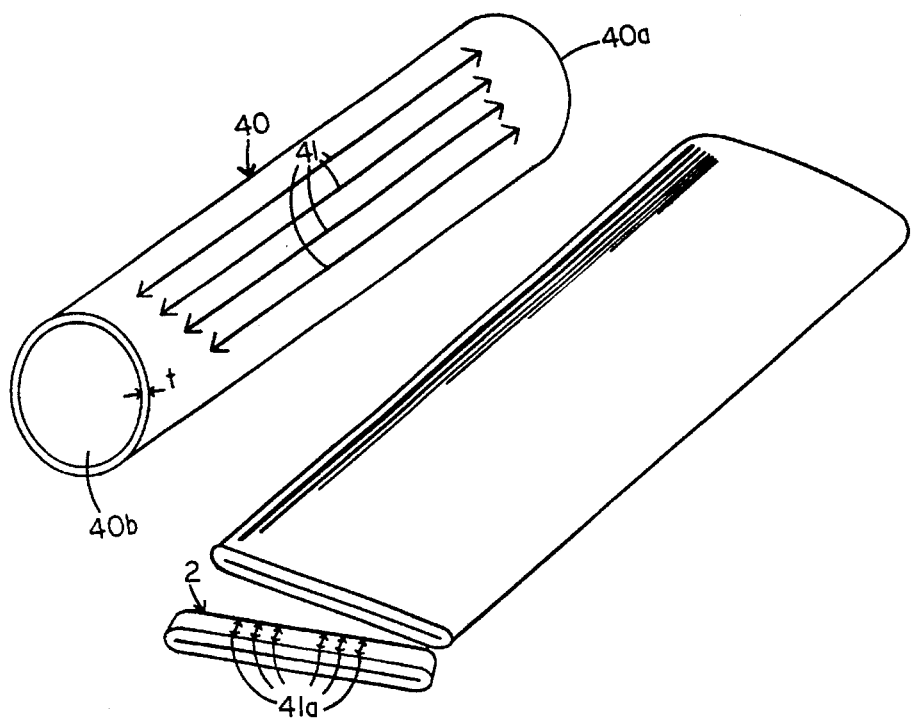
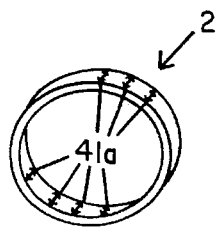

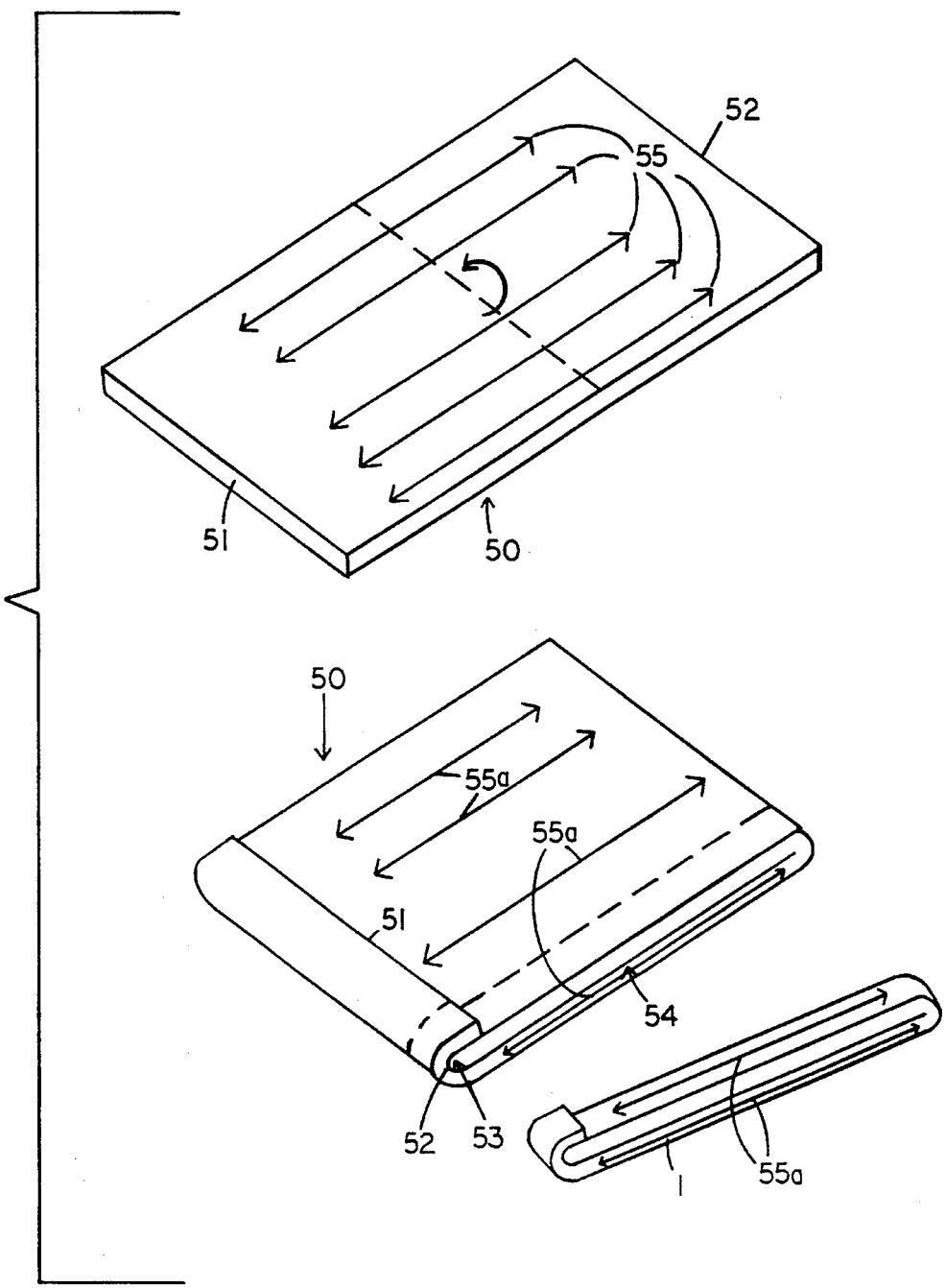

RUBBER BAND BINDER

FIELD OF THE INVENTION

This invention relates to elastic binders for paper files, bundles, and folders and in particular such elastic binders which are self adjustable and made of rubber bands.

BACKGROUND OF THE INVENTION

A common means for holding papers, files, folders, and the like (hereinafter referred to collectively as "file" or "files"), together, particularly in law offices, doctor's offices and hospitals, is the ubiquitous large rubber band, which stretches to extend along the width of the file and to accommodate the thickness thereof. If one large band is used, particularly with small items such as index cards, it is common practice to twist the rubber band at right angles to effect two dimensional binding, However, on the non-twisted side, the portions of the rubber band tend to shift away from each other and papers can and do fall out of the files secured in this manner. It is also common practice to utilize two separate rubber bands, transverse to each of the length and width of the file, to effect a binding. The use of several separate rubber bands is however awkward. There is also a lack of overall ability to adjust the bands, relative to each other, and as the bands are free to move relative to each other on both sides, papers can and do fall out from both sides.

Another problem with respect to utilization of the common rubber bands, on files which are archived over extended periods of time, is that they dry out. This undesirable characteristic is a result of the manner in which rubber bands are manufactured. The usual method of manufacturing rubber bands entails extruding rubber material in a tubular formation with the bands being thinly sliced off the tube to the desired width. Rubber extruded in this manner has a grain parallel to the length of the tube, and the bands are sliced across the grain. This results in the grain of a sliced off rubber band being directed across the very narrow width of the band. Thus, as the band is stretched, the grain is opened and exposed to the air, permitting the exposed resins in the rubber to dry out. Over time, with extended storage and exposure, the rubber band dries and becomes embrittled to the point of breakage.

Rubber bands used in the past, for purposes of file binding, have generally and commonly been used in pairs, or with a larger band, which is overstretched and twisted. Alternatively, configurations such as hook and eye interconnective elements and the like, as disclosed in U.S. Pat. No. 4,569,108, have been utilized in effecting a more uniformly tensioned binding. However, this and other similar methods of binding require the use of multiple components and interconnective members whereby the economics of production and utilization, particularly with a large number of files, is prohibitive.

SUMMARY OF THE INVENTION

Generally the present invention comprises a one piece elastic binder element comprised of elastic band means which comprises either one or two elastic, and preferably of rubber, bands (i.e., each band being in the form of an endless loop). The present invention further comprises a novel method for producing rubber bands having enhanced archival binding properties, and the rubber bands so produced. The elastic binder element comprises two bands or portions of a single band, being held together with two retaining means. The retaining means are deployed such that the one or two bands are configured in dual, spaced, cruciformic or cross-like configurations (i.e., each configuration having a central point, defined by each of the retaining means, from which four arms, comprised of segments of the elastic band or bands, extend, at approximate 90° intervals—full lateral and longitudinal extension). The cruciformic configurations are suitable for respective deployment on the front and rear of a file, to engage all four sides of the file, in the binding thereof. Preferably, when placed on the file, the respective retaining means are at the bisection point of each of the lateral and longitudinal arm extensions. Four connective element segments, of the band or bands, interconnect the front arms with the rear arms, thereby peripherally retaining the file between the respective cruciformic configurations. No relative movement or shifting is possible between the lateral and longitudinal holding arms and the files and papers are positively held thereby.

In the embodiment wherein a single elastic band is utilized, the elastic band is twisted on itself with a half turn. The overlapping twisted segments of the elastic band are held together by first retaining means such as a short, inexpensive, loose fitting clamping element, preferably of metal, for structural strength; which encloses the twisted, overlying segments of the band. The outer, distal portions, or "free ends" of the twisted rubber band are then brought together and held together by second retaining means, e.g. a second short clamping element, to complete the binder element of the present invention, in the dual, spaced, cross-shaped configuration. In this embodiment, both the first and second retaining means do not provide a tight compression engagement. Instead, both retaining means, loosely retain the respectively juxtaposed segments of the band in relative sliding movement engagement. Adjustment of the length of the legs of the cross, is therefore possible, to accommodate the different length and width of a file, as well as varying thickness thereof, with a uniform tension.

Rubber bands of the requisite size (of at least 16" flat length), for use in the present invention, cannot be effectively or economically made by existing extrusion methods. In accordance with the present invention, such very long bands are made, with a novel method of manufacture, by initially rolling or calendering a flat sheet of rubber, and forming it into a tube formation by slightly overlapping opposing ends of the sheet and sealing them to each other, by sealing means such as vulcanization. The overlap is minimized to an extent only sufficient to permit effective sealing, without formation of a weak point in the circumference of the tube (and in the subsequently formed bands). The rubber sheet is positioned, prior to the overlapping end sealing, such that the grain of the rubber is directed longitudinally around the circumference of the tube. With such method of preparation, the grain is directed circumferentially along the length of the band, as opposed to the width-extending grain of prior art rubber bands. As a result, when the band is used for binding, tensioning actually closes the grain, thereby preserving integrity of the rubber material. It is, of course, understood that rubber bands of smaller dimension, such as of standard binder size, can be made by this method, to preserve rubber integrity and are also included within the purview of the present invention.

In an alternative, less preferred embodiment of the present invention, a unitary elastic binder element is comprised of two substantially equal dimensioned rubber bands, co-extensively placed upon each other, with two distal areas of respective adjacent segments being attached with two retaining means, such as clamping elements, similar to those previously described. A similar cross-like unitary elastic binder element is formed thereby (with the retaining members comprising the centers of the cross configurations). The rubber bands, in this embodiment, are preferably made in accordance with the longitudinally, grain-directing method of the present invention, to maintain band integrity on tensioning.

It is an object of the present invention to provide an economical, one piece or unitary elastic binding element for holding standard bulky files.

It is a further object of the present invention to provide such binding element comprised of a single rubber or elastic element which is capable of being evenly tensioned.

It is yet another object of the present invention to provide a method for producing rubber bands with a circumferential grain, having reduced susceptibility to tensioned breakage, and the rubber bands so produced.

It is a still further object of the present invention to provide such one piece file binder element made of the rubber bands with reduced susceptibility to drying and breaking from embrittlement under long term tensioned storage conditions.

These and other objects, features and advantages of the present invention will become more evident from the following discussion and the drawings in which:

SHORT DESCRIPTION OF THE DRAWINGS

FIG. 4 is a side view of an elongated rubber band of the present invention;

FIG. 2 is a view of the rubber band of FIG. 1, being twisted and held in such conformation by a short staple-like retaining element, in the first stage of constructing the binder element;

FIG. 3 is the rubber band of FIG. 2, having its distal ends brought together and held by a second staple-like retaining element to form the binder element;

FIG. 4 is the binder element of FIG. 3, shown as being utilized with a file, with adjustment to uniformly distribute tension;

FIG. 4a shows the binder element of FIG. 3, shown is being placed on a file with automatic tension adjustment being effected;

FIG. 5 is an alternative embodiment of the present invention wherein two rubber bands are held together by retaining elements to form a unitary binding element;

FIG. 6 depicts the general method of the prior art, in which rubber bands are made with grain running across the band width;

FIG. 7 depicts a sheet of rubber being formed in a tubular formation, in accordance with the present invention, and whereby the rubber bands are sliced off, with the grain running along the length of the band.

DETAILED DESCRIPTION OF THE INVENTION

The present invention comprises a unitary elastic binding element comprised of one twisted or two separate rubber bands, and having two separate retaining elements which hold the band or bands in a dual, spaced, but connected cruciformic or cross-like configuration. The configuration permits insertion of a file between the cross-like configurations, with edge connections between the dual configurations, being situated at the four edges of the file. Resilience of the rubber bands, which comprise the binding element, allows for stretching of the edges to accommodate various thicknesses or shapes of the file or other objects. In a preferred embodiment of the present invention, wherein a single rubber band is utilized, the retaining elements permit relative sliding movement of the portions of the rubber band, for adjustment, whereby there is an equalized tensioning of the binding element in holding the file. In a further preferred embodiment of the present invention, the rubber band or bands are made of natural rubber utilizing a method which results in the grain of the rubber being directed longitudinally along the length of the individual bands rather than across the width, as in prior art rubber bands. With rubber bands made in accordance with this preferred embodiment, archival retaining of files, folders, bundles of papers and the like is enhanced, with reduced incidence or even substantial elimination of drying and breaking of the tensioned rubber bands.

The retaining element preferably comprises a relatively strong, short metal (or plastic, if sufficiently strong) clamping element, i.e., a short bent wire or flat metal tab-like member, with the ends thereof being brought adjacent to each other after the segments of the rubber band or bands being retained, are loosely positioned therewithin; whereby the segments of a rubber band or bands are not removable therefrom. A tight engagement is however not desirable, since it retards adjustability and it pinches the rubber material, with resultant degradation of the rubber at such point.

Though the retaining or clamping element may be made of any material and configuration, it should have the characteristics of being capable of resisting tensioned pulling of the rubber band or bands, which it is retaining, without deformation or breakage. It is preferred that the retaining element be relatively small, without sharp edges which can degrade or cut the rubber, and that it provide a loose retention which permits relative movement of the rubber bands or segments of the rubber band when tension is relieved, such as by manual manipulative movement. Additionally, the material of such element should be chemically compatible with the rubber. Thus, for example, materials such as iron, copper and aluminum which readily form oxides are not desirable since the oxides tend, over time, to react with sulfur in the rubber, to form acids which deteriorate the rubber. A preferred material, particularly for archival use, is a tin coated brass, which has minimized oxide formation.

DETAILED DESCRIPTION OF THE DRAWINGS AND THE PREFERRED EMBODIMENTS

With specific reference to the drawings, in FIG. 1 an elongated rubber band 1 is shown, with mid-points 5 of its overall flat length L, of about 16". As shown in FIG. 2, the rubber band 1 is given a half twist to cause overlapping of the mid-points 5 with a retaining element 21, in the form of a metal clamping member, being placed around the overlapping mid-points 5, to loosely hold them together (FIG. 3). In FIG. 3, the free distal ends 11a and 11b, of rubber band 1, are brought together and held in place by retaining element 22, with a similar loose retention, to complete construction of the one piece binder element 10 of this embodiment.

With reference to FIG. 4, the binder element 10 is positioned on a file 30, with the retaining elements 21 and 22 being approximately centrally located on the front and rear surfaces 30a and 30b respectively, of the file. The retaining elements 21 and 22 with legs 10a–d and 10e–h respectively form the connected cruciformic structures 1a and 1b. Manipulation and adjustment of the binder element legs 10a–d, shown by the arrows, permits customized adjustment and equalization of tension, with movement of the legs through the retaining element 21. A similar adjustment is possible with binder element legs 10e–h, through retaining element 22, on the rear side of the file. With change of the file thickness, such as by addition or removal of papers, leg connecting end elements 16a–d stretch and contract accordingly to accommodate the changed thickness, in conjunction with the leg movement adjustment, to provide a true customized fit.

As shown in FIG. 4a, automatic adjustment is possible by folding the binder element 10 into a general band configuration and placing it in such form on the file 30. Thereafter, two of the legs 10a–d (and connective leg from 10e–h), on opposite sides of retaining elements 21 and 22 are moved, as shown by the arrows, to positions approximately 90° away from their original placement and approximately 180° from each other. All the legs are thereby automatically equally tensioned.

In another embodiment of the present invention, a one piece binder element 10' is made of two standard type, seven inch rubber band elements 2a and 2b, as shown in FIG. 5. The rubber band elements 2a and 2b are coextensively positioned adjacent one another and the ends 11a' and 11b' are attached to each other by respective retaining elements 21' and 22'.

Binder element 10' is formed thereby, with a cruciformic configuration similar to that of binder element 10, as shown in FIG. 4, when similarly positioned on a file 30. Because of the fixed length of each of rubber band elements 2a and 2b, adjustment is however not possible as with the single rubber band embodiment.

FIG. 6 depicts the method by which standard type rubber bands are made. A closed end tube 40 is formed of natural rubber and blown to the requisite dimensions, with a seven inch flattened cross section length, being the approximate maximum blowable dimension with uniform rubber thickness t. When formed in this manner, the grain 41 of the rubber extends from the closed end 40a of the tube to the open end 40b. As a result, rubber bands 2, which are sliced off the tube 40, have respective grains 41a, extending along the narrow width of the band. When stretched, as shown, the grain 41a opens up, thereby permitting drying of resins in the rubber, with consequent embrittlement and breakage.

In accordance with the present invention, and as shown in FIG. 7, a sheet 50 of natural rubber is originally calendered, to whatever dimensions are desired, without problem. Thus, a 32" long sheet 50 is formed and then folded over itself, to provide a flattened 16" length (a 38" sheet forms a flattened 19" length, another useful length, etc.). Opposite ends 51 and 52 of the sheet 50 are slightly overlapped at 53 and the overlapped ends are vulcanized to seal them together to form flattened cylinder 54. An effective overlap dimension is about ⅛", with the strength of the seal being at least that of the rubber itself. The rubber sheet 50 has a grain 55 extending in the direction shown by the arrows, and is folded along the grain, whereby the grain extends around the circumference of the formed cylinder 54. Rubber bands 1 are sliced off the cylinder with the grain 55a extending longitudinally along the length of the rubber band, i.e., circumferentially, whereby when the rubber band is stretched, the grain closes, thereby protecting the resins in the rubber from drying out, thus maintaining the integrity of the rubber band even on long term tensioned storage.

It is understood that the above description and embodiments illustrated are exemplary of the present invention and that changes may be made in the length and structure of the bands as well as the retaining members without departing from the scope of the present invention as defined in the following claims.

What is claimed is:

1. A one piece elastic binder element, for binding files, and bundles, said binder element comprising elastic band means and two retaining elements, wherein said retaining elements hold segments of said elastic band means in a binder element configuration, suitable for effecting said binding, said binder element configuration, when in place on said files or bundles, comprising two spaced, interconnected cruciformic configurations, with one of said cruciformic configurations having a central point, defined by one of the retaining elements, from which, four arms, comprised of segments of said elastic band means, extend, at approximate 90° intervals; and wherein the other of said cruciformic configurations has a central point, defined by the other of the retaining elements, from which, four arms, comprised of other segments of said elastic band means, extend, at approximate 90° intervals; and wherein four connective element segments of said band means respectively interconnect the four arms of the respective cruciformic configurations, wherein said retainer means is adapted to loosely retain respectively juxtaposed segments of the band in relative sliding movement engagement, whereby adjustment of relative lengths of said arms, is therefore possible, to accommodate the different length and width of a file, as well as varying thickness thereof, with a uniform tension.

2. The one piece binder element of claim 1, wherein said elastic band means comprises two substantially equal dimensioned elastic bands co-extensively placed upon each other, with two distal areas of respective adjacent segments being attached with said two retaining means.

3. The one piece binder element of claim 3, wherein said elastic bands comprise rubber bands.

4. The one piece binder element of claim 1, wherein said elastic band comprises a rubber band.

5. The one piece binder element of claim 4, wherein the rubber band has a grain which extends in a direction not directly across the width of the rubber band.

6. The one piece binder element of claim 4, wherein said first and second clamping elements are each comprised of bent metal members wherein the metal members have rounded edges.

7. The one piece binder element of claim 6, wherein said metal members are substantially free of oxides which react with the rubber.

8. The one piece binder element of claim 7, wherein said metal members are comprised of brass plated with tin.

9. The one piece binder element of claim 4, wherein said elongated length is at least 16 inches.

10. The one piece binder element of claim 1, wherein each rubber band has a grain which extends in a direction not directly across the width of the rubber band.

11. A one piece elastic binder element, for binding files, and bundles, said binder element comprising elastic band means and two retaining element comprising elastic band means and two retaining elements, wherein said retaining elements hold segments of said elastic band means in a binder element configuration, suitable for effecting said binding, said binder element configuration, when in place on said files or bundles, comprising two spaced, interconnected cruciformic configurations, with one of said cruciformic configurations having a central point, defined by one of the retaining elements, from which, four arms, comprised of segments of said elastic band means, extend at approximate 90° intervals; and wherein the other of said cruciformic configurations has a central point, defined by the other of the retaining elements, from which, four arms, comprised of other segments of said elastic band means, extend, at approximate 90° intervals; and wherein four connective element segments of said band means respectively interconnect the four arms of the respective cruciformic configurations, wherein said elastic band means comprises a single elongated elastic band having distal ends, with said band being twisted on itself with a half turn, at an approximate mid-point of its elongated length, whereby segments of the band are overlapped, with the overlapping twisted segments of the band being held together by a first of said retaining means, said first retaining means comprising a clamping element, which loosely encloses the twisted, overlapping segments of the band, and wherein the distal ends of the band are brought together and held together by second retaining means, comprising a second clamping element, whereby said two spaced, interconnected cruciformic configurations are formed thereby, and wherein both first and second retaining means, loosely retain the respectively juxtaposed segments of the band in relative sliding movement engagement, whereby adjustment of relative lengths of said arms, is therefore possible, to accommodate the different length and width of a file, as well as varying thickness thereof, with a uniform tension.

\* \* \* \* \*